US010284121B2

(12) United States Patent
Sun et al.

(10) Patent No.: US 10,284,121 B2
(45) Date of Patent: May 7, 2019

(54) PERMANENT MAGNET MOTOR WITH ABSOLUTE ROTOR POSITION DETECTION

(71) Applicant: Rockwell Automation Technologies, Inc., Mayfield Heights, OH (US)

(72) Inventors: Xikai Sun, Shanghai (CN); Gennadi Sizov, Shorewood, WI (US); Robert H. Schmidt, Germantown, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 15 days.

(21) Appl. No.: 15/335,522

(22) Filed: Oct. 27, 2016

(65) Prior Publication Data

US 2018/0091072 A1 Mar. 29, 2018

Related U.S. Application Data

(60) Provisional application No. 62/401,524, filed on Sep. 29, 2016.

(51) Int. Cl.
*H02P 6/18* (2016.01)
*H02P 23/14* (2006.01)
*H02P 21/18* (2016.01)

(52) U.S. Cl.
CPC ............... *H02P 6/18* (2013.01); *H02P 21/18* (2016.02); *H02P 23/14* (2013.01)

(58) Field of Classification Search
CPC .......... H02K 1/27; H02K 1/272; H02K 1/276; H02K 1/274; H02K 1/2753; H02K 1/2766; H02K 21/12; H02K 21/14; H02K 2201/06; H02K 47/24; H02K 15/03; H02K 21/046; H02K 21/225
See application file for complete search history.

(56) References Cited

U.S. PATENT DOCUMENTS

| 4,458,184 A * | 7/1984 | Kawate ................. H02K 29/06 310/46 |
| 4,847,982 A | 7/1989 | Morrill |
| 5,107,159 A | 4/1992 | Kordik |
| 7,482,802 B2 | 1/2009 | Finkler et al. |

(Continued)

OTHER PUBLICATIONS

Yong-Cheol Kwon, and Seung-Ki Sul; Noor Aamir Baloch, Sohji Murakami, and Shinya Morimoto, Design and Control of IPMSM Sensorless Drive for Mechanical Rotor Position Detection Capability, Proceeding of IEEE ECCE 2013, Sep. 2013—(7) pages.

*Primary Examiner* — Bickey Dhakal
(74) *Attorney, Agent, or Firm* — Boyle Fredrickson, SC (57) ABSTRACT

An IPM motor in which the absolute position of the rotor may be determined is disclosed. The IPM motor includes asymmetries in both the rotor and the stator. The rotor includes an asymmetrical pole configuration for one of the pole pairs in the rotor, and the stator includes a different number of turns for each winding of one phase of the motor. The different number of turns on each winding causes a different magnitude of flux to be generated with each winding. The flux interacts with the asymmetrical pole pair to identify to which winding the asymmetrical pole is proximate. A position sensing routine identifies an angular position with respect to each winding. The position sensing routine, in combination with the flux interaction between the windings and the asymmetrical pole provide an absolute position of the rotor within the IPM motor.

16 Claims, 3 Drawing Sheets

(56) References Cited

U.S. PATENT DOCUMENTS

| | | | |
|---|---|---|---|
| 8,227,953 B2 | 7/2012 | Suzuki et al. | |
| 8,536,748 B2 | 9/2013 | Liang et al. | |
| 8,860,276 B2 | 10/2014 | Takizawa | |
| 9,831,729 B2 | 11/2017 | Kim et al. | |
| 10,020,703 B2* | 7/2018 | Lin | H02K 3/28 |
| 2010/0213781 A1* | 8/2010 | Rahman | H02K 1/2766 |
| | | | 310/156.56 |
| 2013/0147299 A1* | 6/2013 | Rahman | H02K 1/2766 |
| | | | 310/156.01 |
| 2014/0246939 A1* | 9/2014 | Murakami | H02K 1/148 |
| | | | 310/156.05 |
| 2014/0246940 A1* | 9/2014 | Murakami | H02K 29/12 |
| | | | 310/156.49 |
| 2016/0276885 A1* | 9/2016 | Jurkovic | H02K 1/2766 |
| 2017/0264178 A1 | 9/2017 | Stauder et al. | |
| 2018/0091072 A1 | 3/2018 | Sun et al. | |
| 2018/0145565 A1 | 5/2018 | Pozmantir et al. | |

* cited by examiner

PERMANENT MAGNET MOTOR WITH ABSOLUTE ROTOR POSITION DETECTION

CROSS REFERENCE TO RELATED APPLICATIONS

This application claims priority to U.S. Provisional Patent Application Ser. No. 62/401,524, filed on Sep. 29, 2016, titled "Permanent Magnet Motor with Absolute Rotor Position Detection" the entire contents of which is incorporated herein by reference.

BACKGROUND OF THE INVENTION

The subject matter disclosed herein relates generally to a permanent magnet (PM) motor and, more specifically, to a PM motor having a physical construction such that the absolute position of the rotor may be determined without a separate position feedback device.

PM motors include a set of magnets in the rotor. The magnets are either inserted in slots within the rotor interior permanent magnets) or mounted to the outer surface of the rotor (i.e., surface permanent magnets). The magnets are configured such that the magnetic field varies in strength at different locations around the rotor. The magnets may be, for example, shaped such that more magnetic material exists in a central area of the magnet and less magnetic material exists toward the edge of the magnet or inserted within the rotor such that a portion of the magnet is further from the surface of the rotor. The magnetic field produced by the permanent magnets interacts with the field generated by a stator current to control rotation of the motor.

In order to control rotation of the PM motor, a motor drive generating the current for the stator windings must know the orientation of the rotor within the motor. Historically, it has been known to provide an external position feedback device, such as an encoder or resolver, along with the PM motor. Encoders and resolvers are coupled to the rotor and generate a signal corresponding to the angular position of the rotor. However, an external position feedback device adds increased space requirements and cost to the motor. Further, it is common that the environment in which the PM motor operates has electromagnetic noise. The conductors carrying the position signal between the feedback device and the motor drive must be shielded and/or filtered to reduce interference from the electromagnetic noise. The additional device also adds an additional point of failure within the control system.

In order to overcome some of these issues, efforts have been made to provide sensorless methods for determining the angular position of the rotor. Commonly, these sensorless methods inject a high frequency signal into the stator windings and monitor the resulting voltage and/or current signal responsive to the injected signal to identify an electrical angle of the rotor within one set of pole pairs. However, PM motors typically have multiple identical pole pairs and the electrical angle spans zero to three hundred sixty degrees over each pole pair. The motor drive, therefore, only knows the angular position of the rotor with respect to one electrical cycle and not an absolute mechanical position of the rotor. If, for example, a rotor has eight poles and, therefore, four pole pairs, the injected signal may determine that the rotor is at one of four different orientations within a complete revolution of the rotor. Thus, the injected signal may be used to determine a location of the rotor with respect to one set of pole pairs but it does not provide an absolute mechanical position of the rotor with respect to a full revolution of the rotor.

Thus, it would be desirable to provide an improved system for determining the absolute mechanical position of a rotor within a PM motor without utilizing an external position sensor.

BRIEF DESCRIPTION OF THE INVENTION

The subject matter disclosed herein describes an improved system for determining the absolute position of a rotor within a PM motor without utilizing an external position sensor. The PM motor has a physical construction such that the absolute position of the rotor may be determined. The PM motor is combined with a motor drive to provide absolute angular position information of the rotor without a separate position feedback device. The PM motor includes a multi-phase, multi-slot stator. For purposes of illustration, the stator is a three-phase stator, having twelve slots. The PM also includes a rotor. For purposes of illustration, the rotor is an eight pole rotor. The PM may be divided into a number of sections based on the number of phases, slots, and poles.

According to the exemplary embodiment, the motor may be divided into four segments, or sections, where each segment includes three slots and two poles. Consequently, each segment spans ninety degrees of the motor. Each phase of the stator is wound about one tooth located between slots and the three slots of each section are configured such that three teeth are present within each segment. In other words, each segment begins at a center line of a slot, extends across one half slot, two full slots, and a second half slot.

Both the rotor and the stator include asymmetries which are utilized to detect the absolute angular position of the rotor. The rotor is an interior permanent magnet (IPM) rotor which includes an asymmetrical pole configuration, and the stator includes an asymmetrical winding configuration. For the exemplary embodiment, each segment includes two poles, or one pole pair, where one pole is a north pole and the other pole is a south pole. Each set of pole pairs includes a primary magnet configuration designed to provide a desired interaction between the stator windings and the magnets to control operation of the motor. This primary magnet configuration is identical for each pole pair within each segment of the IPM motor. One segment of the motor includes a secondary magnet configuration as well. The secondary magnet configuration is configured to interact with the flux producing component of the current supplied in the stator such that the secondary magnet configuration may be used in the determination of the absolute angular position of the rotor. For the exemplary embodiment, each phase includes one winding within each segment of the motor. Within each segment, the winding for each phase has the same number of turns. However, between different segments of the motor the number of turns in each winding for the phases is different. The different number of turns causes a different magnitude of flux to be generated by each phase within each segment. As a result, the magnitude of the flux producing component of the current varies between segments. Further, the interaction between the flux producing component of the current and the secondary magnet configuration allows a motor drive connected to the IPM motor to determine an absolute mechanical position of the rotor within the IPM motor.

According to one embodiment of the invention, a system for determining an absolute, mechanical position of a PM motor is disclosed. The system includes a stator in the PM motor having multiple windings, where each winding includes multiple turns of an electrical conductor, and a rotor in the PM motor having multiple pole pairs, where each pole pair includes a primary set of magnets operable to interact with a current conducted in the windings to cause rotation of the rotor. The motor also includes multiple segments, where the windings are distributed within each of the segments. The number of turns for each winding within each segment is the same while the number of turns for each winding in different segments is different. The pole pairs are distributed within each of the segments, and the pole pairs within one of the segments includes an asymmetry with respect to the pole pairs in the other segments.

According to another embodiment of the invention, a system for determining an absolute, mechanical position of a PM motor is disclosed. The system includes a PM motor, having a rotor and a stator, and a power converter operatively connected to the PM motor. The stator has multiple windings for each phase of input power to the PM motor distributed around the stator, where each winding includes multiple turns of an electrical conductor and the number of turns for each winding for one of the phases is different. The rotor has multiple pole pairs, where one of the pole pairs is different than the other pole pairs. The power converter provides either a regulated voltage or a regulated current to the windings in the stator to control rotation of the rotor, and the power converter is operable to execute first and second position detection modules. The first position detection module determines a position of the rotor with respect to one of the windings for each phase of input power, and the second position detection module determines next to which of the plurality of windings distributed around the stator the pole pair that is different is located. The absolute, mechanical position of the PM motor is determined as a function of the position of the rotor determined by the first position detection module and of the winding next to which the pole pair that is different is located as determined by the second position detection module.

According to still another embodiment of the invention, a method for determining an absolute, mechanical position of a PM motor is disclosed. The PM motor includes a rotor and a stator and has a plurality of segments distributed around the PM motor, where each segment spans an equal distance around the PM motor. The rotor has a plurality of pole pairs, and a first pole pair includes a first asymmetry not present in the other pole pairs. The method includes the steps of determining a first position of the rotor, determining a second position of the rotor, and determining the absolute, mechanical position of the PM motor as a function of the first position and the second position. The first position of the rotor of the PM motor is determined with respect to one of the plurality of segments with a first position detection module operative within a power converter controlling operation of the PM motor. The second position of the rotor of the PM motor is determined with a second position detection module operative on the power converter. The second position detection module identifies one of the segments within which the first pole pair is located as a function of a second asymmetry within the stator of the PM motor. The second position is determined as a function of the first asymmetry and the second asymmetry.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENTS

Figure 1:
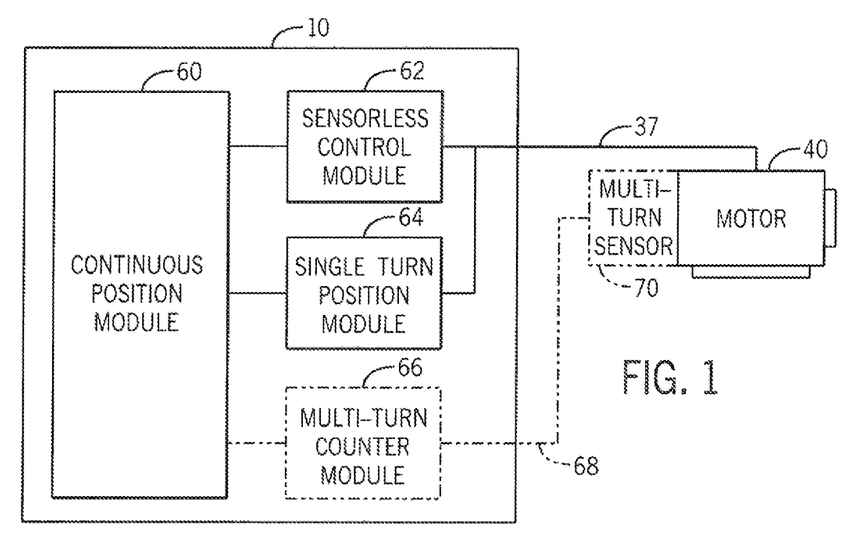
FIG. 1 is a block diagram representation of an exemplary motor drive and motor incorporating one embodiment of the present invention.

Turning initially to FIG. 1, a motor drive 10 is connected to a Permanent Magnet (PM) motor 40 to control operation of the PM motor. The motor drive 10 includes a number of modules that may be used to determine an absolute angular position of a rotor 45 (see also FIG. 3) within the PM motor 40. A continuous position module 60 receives inputs from other modules to maintain knowledge of the angular position of the rotor 45 throughout a revolution of the PM motor 40. This angular position is sometimes referred to as a mechanical position of the PM motor 40, where the mechanical position is measured between zero and three hundred sixty degrees over one revolution of the rotor 45.

The mechanical position is in contrast to an electrical position of the PM motor 40, which spans zero to three hundred sixty degrees over one cycle of an alternating current (AC) voltage applied to the PM motor. The AC voltage applied to the stator of a PM motor interacts with the magnetic field produced by the magnets in the rotor of the PM motor. One cycle of AC voltage causes the rotor to rotate over an angular distance defined by a single pair of poles, or a single pole-pair, within the rotor 45. If the rotor 45 includes multiple pole-pairs, one electrical cycle causes the rotor 45 to rotate only a portion of a mechanical revolution.

As previously discussed, a number of techniques have been developed to identify the electrical position of the rotor 45. The sensorless control module 62 may employ any suitable technique, such as high-frequency injection, to identify an electrical position of the rotor 45. The electrical position defines an angle of the rotor 45 within one of the pole-pairs. If, for example, a PM motor 40 has four pole-pairs, the sensorless control module 62 may be used to identify the current angular position over a ninety-degree mechanical position. This electrical position is provided to the continuous position module 60 for use in determining the continuous mechanical position of the rotor 45. The sensorless control module 62, however, cannot, by itself, identify the mechanical position of the rotor 45. Rather, for the exemplary PM motor 40 with four pole-pairs, the sensorless control module 62 is only able to identify one of four possible mechanical positions. If the sensorless control module 62 determines, for example, that the rotor 45 is at zero electrical degrees, the rotor 45 may be at zero, ninety, one hundred eighty, or two hundred seventy mechanical degrees.

A single turn position module 64 is also provided to differentiate between the four potential mechanical positions of the PM motor 40. As will be discussed in more detail below, the PM motor 40 is constructed such that the rotor 45, the stator 41 (see also FIG. 3), or both the rotor and stator has an asymmetry in its physical construction. The single turn position module 64 is operative to monitor a voltage and/or current supplied to the PM motor 40 and to identify variations in the amplitude of the voltage and/or current resulting from the asymmetry as a function of the angular position of the rotor 45. Based on the variations in the amplitude of voltage and/or current, the single turn position module 64 is able to identify an angular position of the asymmetry within the PM motor 40. The single turn position module 64 passes a signal to the continuous position module 60 corresponding to the angular position of the asymmetry.

With reference still to FIG. 1, the motor drive 10 and the PM motor 40 may optionally be configured to maintain a multi-turn absolute position of the rotor 45 as well. A multi-turn sensor 70 may be mounted to the PM motor 40 that generates a signal 68 corresponding to the number of rotations the PM motor 40 has rotated in either direction. The multi-turn sensor 70 generates an increasing signal in one direction of rotation and a decreasing signal in the other direction of rotation. A zero, or home, position is typically located at a central value between an upper limit and a lower limit for the range of signals the multi-turn sensor 70 generates. The multi-turn counter module 66 is operative to receive the signal 68 from the multi-turn sensor 70 and pass it to the continuous position module 60. Optionally, the multi-turn counter module 66 may perform some processing on the signal 68, such as an analog-to-digital conversion or a format conversion, prior to passing the signal 68 to the continuous position module 60. The continuous position module 60 may use the signals from the sensorless control module 62 and the single turn position module 64 to determine an absolute mechanical position of the rotor 45 within one revolution of the rotor 45 and may use the signal 68 from the multi-turn sensor to determine an absolute mechanical position of the rotor 45 through multiple rotations of the rotor 45. Preferably, the multi-turn sensor 70 includes a mechanical counter or includes non-volatile memory, such that the multi-turn sensor 70 retains count of the number of rotations through a power cycle. The motor drive 10 may then perform an initial position identification routine upon power up using the sensorless control module 62 and the single turn position module 64 to determine the absolute position of the rotor 45 within one revolution and use the signal 68 from the multi-turn sensor 70 to determine a multi-turn position within the range of the multi-turn sensor 70.

Figure 2:
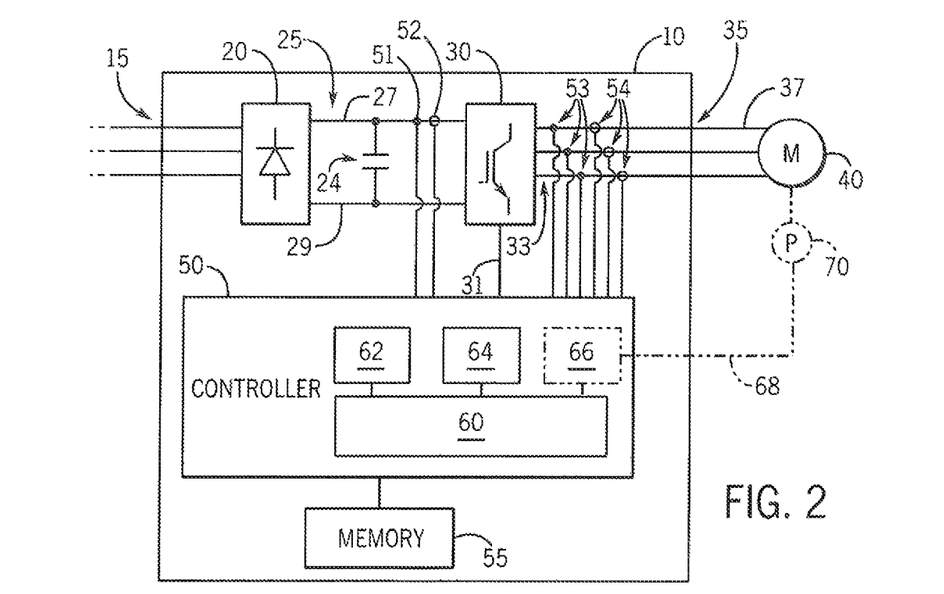
FIG. 2 is a partial schematic representation of another exemplary motor drive and motor incorporating one embodiment of the present invention.

Turning next to FIG. 2, the motor drive 10, according to the illustrated embodiment, is configured to receive a three-phase AC voltage at an input 15 of the motor drive 10 which is, in turn, provided to a rectifier section 20 of the motor drive 10. The rectifier section 20 may include any electronic device suitable for passive or active rectification as is understood in the art. The rectifier section 20 may include, for example, a set of diodes forming a diode bridge that rectifies the three-phase AC voltage to a DC voltage on the DC bus 25. Optionally, the rectifier section 20 may include other solid state devices including, but not limited to, thyristors, silicon controlled rectifiers (SCRs), or transistors to convert the input power 15 to a DC voltage for the DC bus 25. The DC voltage is present between a positive rail 27 and a negative rail 29 of the DC bus 25. A DC bus capacitor 24 is connected between the positive and negative rails, 27 and 29, to reduce the magnitude of the ripple voltage resulting from converting the AC voltage to a DC voltage. It is understood that the DC bus capacitor 24 may be a single capacitor or multiple capacitors connected in parallel, in series, or a combination thereof. The magnitude of the DC voltage between the negative and positive rails, 29 and 27, is generally equal to the magnitude of the peak of the AC input voltage.

The DC bus 25 is connected in series between the rectifier section 20 and an inverter section 30. The inverter section 30 consists of switching elements, such as transistors, thyristors, or SCRs as is known in the art. According to one embodiment of the invention, the inverter section 30 includes an insulated gate bipolar transistor (IGBT) and a free-wheeling diode connected in pairs between the positive rail 27 and each phase of the output voltage as well as between the negative rail 29 and each phase of the output voltage. Each of the IGBTs receives gating signals 31 to selectively enable the transistors and to convert the DC voltage from the DC bus 25 into a controlled three phase output voltage to the motor 40. When enabled, each transistor connects the respective rail 27, 29 of the DC bus 25 to an electrical conductor 33 connected between the transistor and the output terminal 35. The electrical conductor 33 is selected according to the application requirements (e.g., the rating of the motor drive 10) and may be, for example, a conductive surface on a circuit board to which the transistors 32 are mounted or a bus bar connected to a terminal from a power module in which the transistors 32 are contained. The output terminals 35 of the motor drive 10 may be connected to the motor 40 via a cable 37 including electrical conductors connected to each of the output terminals 35.

As previously discussed, one or more modules (60-66) are used to control operation of the motor drive 10. According to the embodiment illustrated in FIG. 2, a controller 50 includes the modules and manages execution of the modules. The illustrated embodiment is not intended to be limiting and it is understood that various features of each module discussed herein may be executed by another module and/or various combinations of other modules may be included in the controller 50 without deviating from the scope of the invention. The modules may be stored programs executed on one or more processors, logic circuits, or a combination thereof. The controller 50 may be implemented, for example, in a microprocessor, application specific integrated circuit (ASIC), field programmable gate array (FPGA), or other such customizable device. The motor drive 10 also includes a memory device 55 in communication with the controller 50. The memory device 55 may include transitory memory, non-transitory memory or a combination thereof. The memory device 55 may he configured to store data and programs, which include a series of instructions executable by the controller 50. It is contemplated that the memory device 55 may be a single device, multiple devices, or incorporated, for example, as a portion of another device such as an application specific integrated circuit (ASIC). The controller 50 is in communication with the memory 55 to read the instructions and data as required to control operation of the motor drive 10.

The controller 50 also receives feedback signals indicating the current operation of the motor drive 10. The motor drive 10 may include a voltage sensor 51 and/or a current sensor 52 on the DC bus 25 generating a feedback signal corresponding to the magnitude of voltage and/or current present on the DC bus 25. The motor drive 10 may also include one or more voltage sensors 53 and/or current sensors 54 on the output phase(s) of the inverter section 30 generating a feedback signal corresponding to the magnitude of voltage and/or current present on the electrical conductors 33 between the inverter section 30 and the output 35 of the motor drive. The controller 50 includes components required to convert the signals, such as analog to digital (A/D) converters, buffers, amplifiers, and any other components that would be necessary to convert a feedback signal in a first format to a signal in a second format suitable for use by the controller 50 as would be understood in the art.

Figure 3:
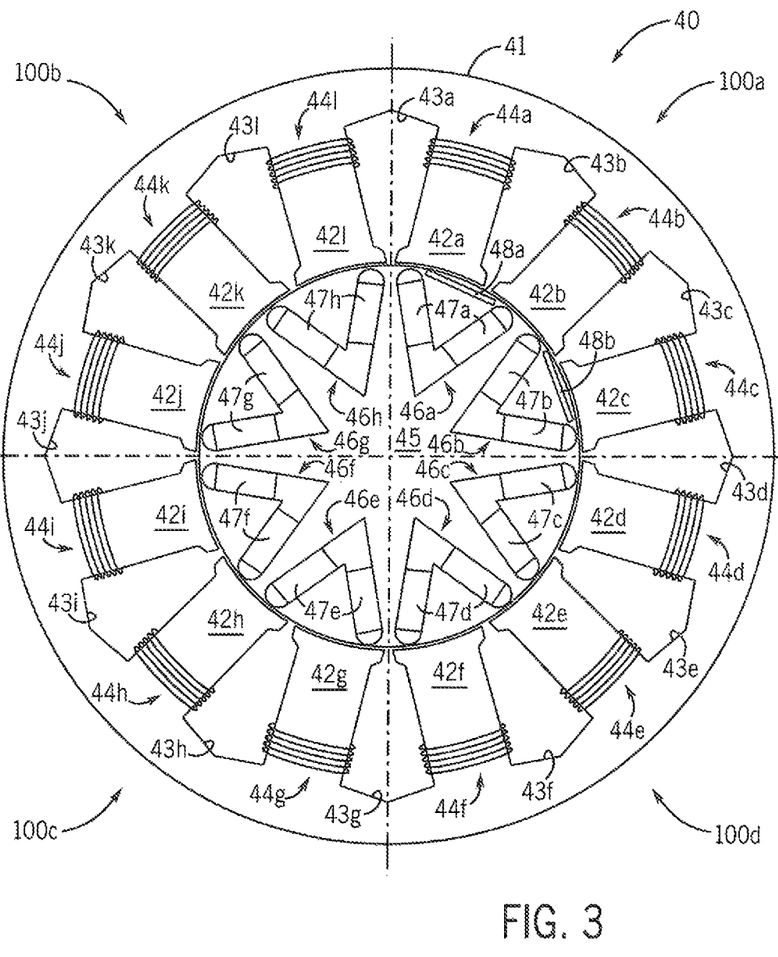
FIG. 3 is a sectional view of a motor according to one embodiment of the invention.
Figure 4:
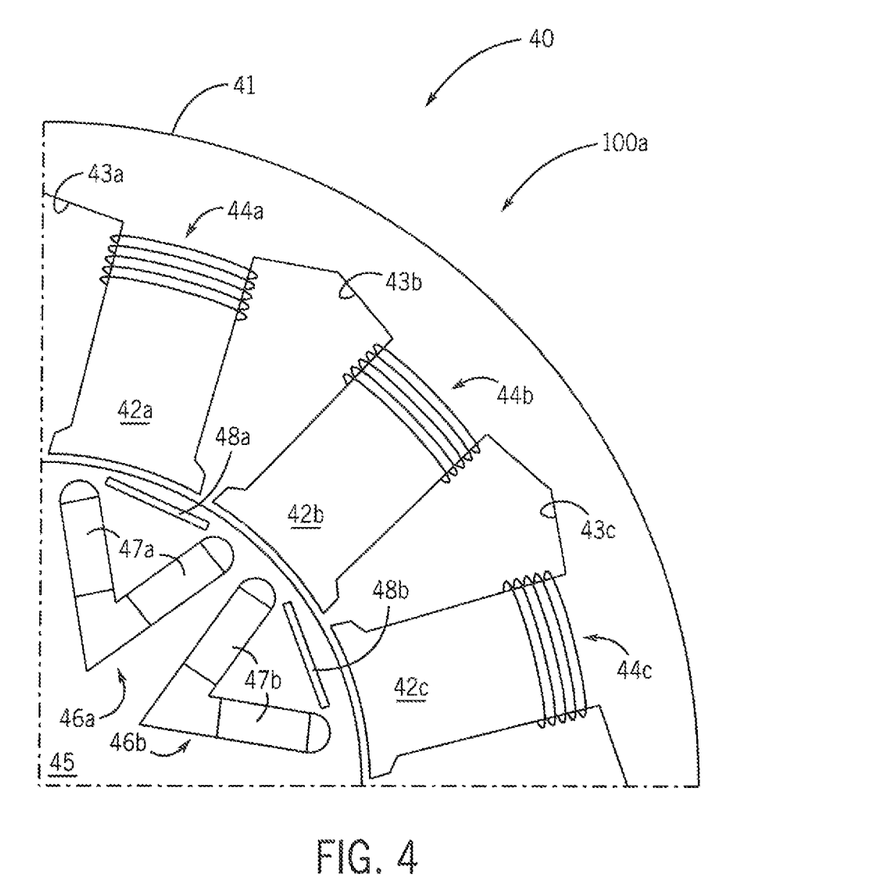
FIG. 4 is a partial sectional view of the motor of FIG. 3.

Turning next to FIGS. 3 and 4, the PM motor 40 includes a rotor 45 having a number of poles 46 and a stator 41 having a number of windings 44. The PM motor 40 is divided into a number of sections 100 as a function of the number of windings 44 and number of poles 46 in the PM motor 40. According to the illustrated embodiment, the PM motor 40 includes twelve windings 44*a*-44*l* and eight poles 46*a*-46*h*. The number of segments 100 into which the PM motor 40 is divided is determined such that an equal number of windings and an equal number of poles is present in each segment 100. The illustrated embodiment includes four segments 100*a*-100*d*, where each segment 100*a*-100*d* includes three windings 44 and two poles 46. As is understood in the art, each winding 44 is wound around a tooth 42 and with the windings filling slots 43 between adjacent teeth 42. Each winding 44 consists of a number of turns, N, wrapped around the tooth 42. The number of turns, N, selected for each winding 44 will be discussed in more detail below. Each pole 46 includes a v-shaped slot in which a pair of magnets 47 is inserted, where one magnet of the pair is inserted into each leg of the v-shaped slot.

As previously indicated, the PM motor 40 is constructed such that the rotor 45, the stator 41, or both the rotor and stator has an asymmetry in their construction. In the illustrated embodiment, the first segment 100*a* includes an asymmetry in the rotor 45. Each pole 46 in the first segment 100*a* includes a secondary magnet 48 in addition to the primary magnet 47. A second, straight slot spans between the upper ends of each leg of the v-shaped slot, and the secondary magnet 48 is inserted into the straight slot, resulting in a different magnetic field generated within the first segment 100*a* than is generated within each of the other segments 100*b*-100*d*. This different magnetic field is utilized by the single turn position module 64 to detect the mechanical position of the rotor 45.

In operation, the motor drive 10 receives a reference signal, such as a speed reference, position reference, or a torque reference corresponding to desired operation of the PM motor 40 and regulates the amplitude and frequency of current and/or voltage supplied to the PM motor 40 to achieve the desired operation of the PM motor 40. In one embodiment of the invention, the controller 50 includes a current regulator module (not shown) to control the current provided to the PM motor 40. The controller uses the current values measured at the output 35 of the motor drive 10 by the current sensors 54. As is understood in the art, Park's transformation may be used to convert the measured three-phase currents into a two-phase representation of the current along a quadrature axis (q-axis) and along a direct axis (d-axis). The q-axis current corresponds to the amount of torque produced by the PM motor 40 and the d-axis current corresponds to the flux established between the rotor and the stator in the motor. The magnitude of flux is a function of the field strength of the permanent magnets 47, 48 in the rotor 45 and of the windings 44 in the stator 41.

The windings 44 are wound such that there is a variation in the magnitude of flux in different segments 100 of the PM motor. The single turn position module 64 utilizes this variation in the magnitude of flux due to the windings 44 in the stator 41 to determine the absolute mechanical position of the rotor 45. With reference again to FIG. 3. the illustrated PM motor 40 includes three windings 44 in each segment 100. Within each segment 100, each winding has the same number of turns. However, each segment 100 has windings with a different number of turns. In other words, the first segment 100*a* includes windings 44*a*, 44*b*, 44*c* that each have a first number of turns, N1. The second segment 100*b* includes windings 44*d*, 44*e*, 44*f* that each have a second number of turns, N2. The third segment 100*c* includes windings 44*g*, 44*h*, 44*i* that each have a third number of turns, N3. The fourth segment 100*d* includes windings 44*j*, 44*k*, 44*l* that each have a fourth number of turns, N4. The first number of turns, N1; second number of turns, N2; third number of turns, N3; and the fourth number of turns, N4 are each different. As a result, the flux in the PM motor 40 varies between segments as a function of the number of turns in each segment.

The interaction between the asymmetrical rotor segment and the windings 44 in each segment 100 creates variations in the d-axis current that are distinct for each segment 100. As previously indicated, the flux in the PM motor 40 is a function of the both the field generated by the permanent magnets 47, 48 and the windings 44 in the stator 41. As the rotor 45 turns, the rotor segment with the asymmetry (i.e., the secondary set of permanent magnets 48) passes each of the different segments 100*a*-100*d* of the stator 41. Even if a constant reference signal is applied to the PM motor 40, such as a constant speed command, and the PM motor 40 is operating at that constant speed, the interaction between the secondary set of permanent magnets 48 and the different numbers of turns in the windings 44 within each segment 100 results in a different value of d-axis current as the asymmetry passes each stator segment 100. The controller 50 monitors the d-axis current and compares the d-axis current to a set of values in a look up table stored in memory 55. The look up table may include a single value of d-axis current for each segment 100, which corresponds to an average value of the d-axis current when the asymmetry is present in the respective segment 100, or, optionally, the look up table may include multiple values of d-axis current for each segment 100, where each value corresponds to a specific angular position (e.g., the secondary magnet 48 is aligned with one of the teeth 42 in the stator 41) within the segment 100. The controller 50 compares the measured value of the d-axis current to the stored values in the look-up table to determine in which segment the secondary magnets 48 are located. This monitoring of the d-axis current and comparison to the look up table may be performed by the single turn position module 64 which then transmits an indication of which segment 100 the secondary magnets 48 are located to the continuous position module 60.

According to an exemplary embodiment, the first number of turns, N1, in the first segment 100a may be eighteen (18) turns per winding 44. The second number of turns, N2, in the second, segment 100b may be nineteen (19) turns per winding 44. The third number of turns, N3, in the third segment 100c may be twenty-one (21) turns per winding 44. The fourth number of turns, N4, in the fourth segment 100d may be twenty-two (22) turns per winding 44. The resulting variation in the magnitude of d-axis current between the first segment 100a and the fourth segment is less than one percent of the average value of the d-axis current, and the resulting variation in the magnitude of d-axis current between adjacent segment 100 as the rotor 45 rotates within the PM motor is less than one-half of one percent (<0.5%) and may be about one-quarter of one percent (0.25%). The small amplitude of the resulting variation in the peak amplitude of the d-axis current due to the varying number of turns on each winding 44 in the stator 41 and due to the asymmetry in the rotor 45 does not adversely affect the performance of the PM motor 40. Yet, the variation in the peak amplitude of the d-axis current is sufficiently large and repeatable that the controller 50 is able to identify next to which segment 100 of the stator 41 the secondary magnets 48 are aligned.

The continuous position module 60 may then determine an absolute mechanical position of the rotor 45 utilizing the position information supplied from both the sensorless control module 62 and the single turn position module 64. The sensorless control module 62 determines an electrical position of the rotor within one segment 100, and the single turn position module 64 identifies in which segment 100 the asymmetry in the rotor 45 is located. Thus, rather than knowing only one of four locations at which the rotor 45 is positioned, based on the electrical position generated by the sensorless control module 62, the continuous position module 60 is able to precisely determine the absolute mechanical position of the rotor 45 within the PM motor 40.

At power up, the continuous position module 60 may initiate a position location routine that applies a known current and/or voltage to the PM motor 40 and measures the resulting current and/or voltage from the sensors 53, 54 at the output of the motor drive 10. Both the sensorless control module 62 and the single turn position module 64 generate their respective position information to the continuous position module 60 responsive to the known current and/or voltage to determine an initial mechanical position of the rotor 45 at power-up. The continuous position module 60 may then continually monitor the position information from the sensorless control module 62 and the single turn position module 64 during operation to maintain a record of the mechanical position of the rotor 45.

In certain applications, it may be desirable to maintain knowledge of rotation of the rotor 45 over multiple turns. For example, a lead screw type drive member may cause a driven member to move forward and backward along a fixed travel distance on a slide, and the lead screw may rotate ten revolutions over the fixed travel distance. By maintaining the continuous knowledge of the mechanical position of the rotor 45 along with a count of the number of revolutions of rotation of the rotor 45, the controller 50 has knowledge of the absolute position of the driven member. The multi-turn sensor 70 generates a signal within a lower limit and an upper limit corresponding to a relative position within the two limits. For example, the multi-turn sensor 70 may generate a zero volt signal at a lower limit and a twelve volt signal at an upper limit, where the span of the multi-turn sensor is ten revolutions. Applied to the exemplary lead screw drive member, the multi-turn sensor generates a zero volt signal at one end of travel and a twelve volt signal at the other end of travel. The resolution of the signal may not be sufficient to determine a precise angular position of the PM motor 40, but it is sufficient to determine an angular position within one revolution of the PM motor 40. Optionally, the multi-turn sensor may generate a digital signal corresponding to a particular number of rotations of the PM motor 40 in either direction.

The disclosed invention has been discussed herein with respect to particular embodiments and/or exemplary embodiments, which are not intended to be limiting. For example, various other configurations of primary magnets 47 and secondary magnets 48 may be utilized to generate an asymmetry in the rotor 45. The number of turns within each segment 100 and the difference in the number of turns between segments 100 may be varied according to a particular machine design. The PM motor 40 may include various numbers of slots 43 in the stator 41 and various numbers of poles 46 in the rotor 45. Various embodiments of a multi-turn sensor and various signals corresponding to the number of turns may be utilized.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A system for determining an absolute, mechanical position of a permanent magnet (PM) motor, the system comprising:
   a stator in the PM motor having a plurality of windings and an outer periphery, wherein each winding includes a plurality of turns of an electrical conductor; and
   a rotor in the PM motor having a plurality of pole pairs, wherein each pole pair includes a primary set of magnets operable to interact with a current conducted in the plurality of windings to cause rotation of the rotor, wherein:
      the motor includes a plurality of segments, wherein each of the plurality of segments extends along a continuous arc defining a portion of the outer periphery of the stator;
      the plurality of windings are distributed within each of the plurality of segments;
      a number of turns for the plurality of turns for each winding within each segment is the same;
      the number of turns for the plurality of turns for each winding in different segments is different;
      the plurality of pole pairs are distributed within each of the plurality of segments; and
      the pole pairs within a first segment, selected from the plurality of segments includes an asymmetry with respect to the pole pairs in the other segments, wherein the pole pairs in the first segment have a different magnetic structure than the pole pairs in the other segments.

2. The system of claim 1 wherein the different magnetic structure is a secondary set of magnets.

3. The system of claim 1 further comprising a power converter operatively connected to the PM motor to provide at least one of a regulated voltage and a regulated current to the plurality of windings in the stator to control rotation of the rotor.

4. The system of claim 3 wherein:
the power converter is operable to execute a first position detection module, a second position detection module, and a continuous position module,
the first position detection module determines a position of the rotor within one of the plurality of segments,
the second position detection module determines within which of the plurality of segments the pole pairs including the secondary set of magnets is located, and
the continuous position module determines the absolute, mechanical position of the PM motor as a function of the position of the rotor within one of the plurality of segments and of the segment within which the pole pairs including the secondary set of magnets is located.

5. The system of claim 4 wherein the power converter executes a commissioning module on power up to determine the absolute, mechanical position of the PM motor.

6. The system of claim 1 further comprising a multi-turn device generating a signal corresponding to one of a plurality of rotations of the rotor.

7. A system for determining an absolute, mechanical position of a permanent magnet (PM) motor, the system comprising:
a stator in the PM motor having a plurality of windings for each phase of input power to the PM motor distributed around the stator, wherein each winding includes a plurality of turns of an electrical conductor and wherein a number of turns for each winding for one of the phases is different; and
a rotor in the PM motor having a plurality of pole pairs, wherein one of the plurality of pole pairs is different than the other pole pairs; and
a power converter operatively connected to the PM motor to provide at least one of a regulated voltage and a regulated current to the plurality of windings in the stator to control rotation of the rotor, wherein:
the power converter is operable to execute a first position detection module, a second position detection module, and a continuous position module,
the first position detection module determines an electrical position of the rotor,
the second position detection module determines next to which of the plurality of windings, distributed around the stator, the pole pair that is different is located, and
the continuous position module determines the absolute, mechanical position of the PM motor as a function of the electrical position determined by the first position detection module and of the winding next to which the pole pair that is different is located as determined by the second position detection module.

8. The system of claim 7, wherein the PM motor includes a plurality of segments;
the plurality of windings for each phase are distributed between the plurality of segments;
the number of turns for each winding within each segment is the same; and
the number of turns for each winding in a first segment selected from the plurality of segments is different than the number of turns for each winding in other segments of the plurality of segments.

9. The system of claim 8 wherein:
the plurality of pole pairs are distributed within each of the plurality of segments;
each of the pole pairs includes a primary set of magnets; and
the pole pair that is different than the other pole pairs includes a secondary set of magnets.

10. The system of claim 7 wherein the power converter executes a commissioning module on power up to determine the absolute, mechanical position of the PM motor.

11. The system of claim 7 further comprising a multi-turn device generating a signal corresponding to one of a plurality of rotations of the rotor.

12. A method for determining an absolute, mechanical position of a permanent magnet (PM) motor, wherein: the PM motor includes a rotor and a stator and has a plurality of segments distributed around the PM motor, each segment spans an equal distance around the PM motor, the rotor has a plurality of pole pairs, and a first pole pair includes a first asymmetry not present in the other pole pairs; the method comprising the steps of:
determining a first position of the rotor of the PM motor with respect to one of the plurality of segments with a first position detection module operative within a power converter controlling operation of the PM motor;
determining a second position of the rotor of the PM motor with a second position detection module operative on the power converter, Wherein the second position detection module identifies one of the plurality of segments, selected from the plurality of segments, within which the first pole pair is located and wherein a second asymmetry is located in the stator and the second position is determined as a function of the first asymmetry and the second asymmetry; and
determining the absolute, mechanical position of the PM motor with a continuous position module operative on the power converter as a function of the first position and the second position.

13. The method of claim 12 wherein each of the plurality of pole pairs includes a primary set of magnets and the pole pair with the first asymmetry includes a secondary set of magnets.

14. The method of claim 13 wherein:
the stator includes at least one winding within each of the plurality of segments,
each winding within one of the segments has an equal number of turns, and
the second asymmetry is defined by a different number of turns in the windings in a first segment, selected from the plurality of segments, than the number of turns in the windings in each of the other segments, selected from the plurality of segments.

15. The method of claim 12 wherein the power converter executes a commissioning module on power up to determine the absolute, mechanical position of the PM motor.

16. The method of claim 12 further comprising the steps of:
reading a third position of the rotor from a multi-turn device corresponding to one of a plurality of rotations of the rotor; and
determining the absolute, mechanical position of the PM motor as a function of the first, second, and third positions.

* * * * *